United States Patent [19]
Onishi

[11] Patent Number: 5,560,446
[45] Date of Patent: Oct. 1, 1996

[54] MOTORCYCLE

[75] Inventor: Yoji Onishi, Kobe, Japan

[73] Assignee: Kawasaki Jukogyo Kabushiki Kaisha, Japan

[21] Appl. No.: 456,530

[22] Filed: Jun. 1, 1995

[30]  Foreign Application Priority Data

Oct. 6, 1994 [JP]  Japan ................................ 6-270420

[51] Int. Cl.⁶ .................................................. B62D 61/02
[52] U.S. Cl. .......................................... 180/219; 180/68.3
[58] Field of Search ................................... 180/219, 225, 180/68.1, 68.2, 68.3; 123/184.31, 184.32, 184.34; 181/229

[56]  References Cited

U.S. PATENT DOCUMENTS 4,440,255  4/1984  Shinozaki ............................... 180/225

FOREIGN PATENT DOCUMENTS 60-131317  7/1985  Japan .
4-201686  7/1992  Japan .................................. 180/68.3

*Primary Examiner*—Kevin Hurley
*Attorney, Agent, or Firm*—Poms, Smith, Lande & Rose

[57]  ABSTRACT

A motorcycle is disclosed with an air intake chamber having a fresh air suction port (that is, an opening through which fresh air is initially sucked into the air intake system) which is connected to the upstream side of an air cleaner and goes in a concavity formed under a fuel tank and is provided at a position across a main frame of the body.

32 Claims, 3 Drawing Sheets

५,५६०,४४६

MOTORCYCLE

BACKGROUND OF THE INVENTION

1. Field of the Invention

The present invention relates to a motorcycle and more particularly to a motorcycle characterized by the construction and arrangement of air cleaners and the like.

2. Description of Related Art

There are motorcycles whose air cleaner is arranged on one side (right or left side) of a body thereof. The air cleaner, which is an equipment connected to the air intake system of an engine, is preferably located near the cylinder or cylinder head of the engine, and the maintenance of a filter element and the like is required at a specified frequency and performed from the outside, so that the place near the engine and on the side of the body is a preferable position. Particularly, for motorcycles in which the so-called V-type engine is horizontally mounted (that is, arranged in such a manner that a crankshaft extends in the right and left direction of the body), there are many cases where the air cleaner is arranged on one side of the body as mentioned above. That is because it is reasonable with respect to effective space utilization and preferable with respect to appearance that the air intake passage connected from the air cleaner to the carburetor is housed in the V-shaped root portion formed by the cylinder, with the air cleaner located on the outside and facing the right or left side of the body. An example of the motorcycle in which an air cleaner is arranged on one side of the body in that manner is described in, for example, the official gazette of Japanese Laid-Open Patent SHO 60-131317.

SUMMARY OF THE INVENTION

An air cleaner arranged on one side of the body is difficult to enlarge the volume thereof. As described also in the above-mentioned official gazette, that is because enlarging the volume causes the air cleaner to extend rightward/leftward and thus approach driver's legs, and to become significantly prominent and thus inferior in appearance. However that may be, in order to reduce a noise (an air intake sound) generated in the air intake system including the air cleaner, it is preferable to have a larger volume of the air cleaner. Although the air intake sound is generated due to the air intake pulsation associated with the reciprocation of pistons within cylinders, the larger the air cleaner volume, the less the air intake sound becomes.

With consideration such points, in the motorcycle described in the above-mentioned official gazette, an air intake duct having a somewhat larger volume is connected to the downstream side of the air cleaner, that is, between the air cleaner and the carburetor. That is because allowing two places of the air cleaner and air intake duct to have volume causes the same effect as in a case where two-step expansion chamber is provided, thereby allowing the pulsation of the intake air to be weakened and thus the air intake sound to be reduced even without enlarging the air cleaner itself to an extent as expected.

However, even where the means described in the official gazette is employed, there is still room for improvement in the following points:

(1) The fresh air suction port in the air cleaner, that is, the opening initially in taking air into the air intake system becomes exposed on the side of body, so that the air intake sound generated at the exposed portion becomes a noise to spread outward. Although the air intake sound is generated at all high-flow-speed portions within the air intake passage, the sound at the fresh air suction port opened outward (so-called air suction sound) is generally most strong, so that even where the effect of pulsation becomes weak, it cannot be said that noise reduction may be sufficiently achieved.

(2) Although it is preferable that the above-mentioned air intake duct connected to the downstream side of the air cleaner is mounted securely and easily on the motorcycle, and not prominent in appearance if possible, such specific requirement is not always satisfied. That is because if the duct is allowed to be enlarged in order to reduce the air intake sound, the duct may become prominent so as to ruin the appearance, or a proper fixing method may not be found.

With respect to a motorcycle in which an air cleaner is provided on the side of the body thereof, an object of the present invention is to provide a means for reducing the air intake sound without enlarging the volume of the air cleaner itself, and for solving the problems described in the above items (1) and (2).

The motorcycle of the present invention is a motorcycle in which an air cleaner is arranged on one side of a body thereof, and an air intake chamber having a fresh air suction port (that is, an opening through which fresh air is initially sucked into the air intake system) and connected to the upstream side of the air cleaner goes in a concavity formed under a fuel tank (that is, in such a manner that all or most portion of the air intake chamber is housed in the concavity) and is provided at a position across a main frame of the body.

In one embodiment, the air cleaner and the air intake chamber may be separately constructed and connected through a sealable joint (such as bell-and-spigot type or flange type joint) to each other. In another embodiment, it may be preferable that a sound absorbing material is mounted to a portion facing the above-mentioned fresh air suction port of the air intake chamber, of the concavity under the fuel tank. In yet a further embodiment, the air cleaners are arranged on the right and left sides of the body, and carburetors may be connected respectively to the downstream side thereof; the commonly-used (for example, one for two air cleaners) air intake chamber may be provided on the upstream side (on the upstream side with respect to air intake flow) of the air cleaners.

The motorcycle of the present invention has a number of functions.

There are provided the air cleaner and the air intake chamber, and those two members function as expansion chambers for intake air, thereby the pulsation of the intake air is effectively weakened. Therefore, the air intake sound is reduced even without enlarging the volume of the air cleaner itself. The air cleaner requires no enlargement of the volume thereof, so that the air cleaner does not approach the driver's legs and ruin the appearance of the motorcycle.

The above-mentioned air intake chamber is provided in such a manner that the chamber goes in the concavity formed under the fuel tank, so that the chamber is hardly visible from the outside and thus has no effect on the appearance. Because of no effect on the appearance, the air intake chamber may also be constructed as the one having no aesthetic sense at a low cost.

The air intake chamber is provided in such a manner that the chamber goes in the concavity under the fuel tank, so that the air intake sound generated at the fresh air suction port of the air intake chamber is hardly emitted outward. This means that as described previously, the vicinity of the air suction port apt to generate the air intake sound is surrounded upward, forward/backward and rightward/leftward by the fuel tank, so that the tank becomes a sound-insulating wall, which reduces the noise toward periphery. Because of being covered with the tank, a provision is easily taken for preventing rain water from entering the air intake chamber, particularly the air suction port thereof.

The air intake chamber is provided at the position under the fuel tank and across the main frame of the body, so that the fixing thereof is easy and secure. That is because the air intake chamber may be mounted to the main frame, or coupled to part of the fuel tank as the case may be.

The invention may also contemplate a construction where the air cleaner and the air intake chamber are separately constructed, so that they are easily manufactured and easily incorporated into the motorcycle. Both members are connected through a sealable joint to each other, thereby preventing fresh air from entering through connecting portion or preventing an additional air suction sound associated with the entering from generating.

Furthermore, the noise reducing action due to the above-mentioned construction may be more remarkable if a portion of the concavity of the fuel tank has a sound absorbing material surrounding the air intake chamber and facing the fresh air suction port which is a source for generating a relatively high air intake sound. In this manner, the sound absorbing material damps effectively the air intake sound by the tank wall surface.

Yet still further it may also be contemplated to use a plurality of air cleaners and carburetors so that the engine performance is allowed to exhibit more highly than in a case where they are one set. Every air cleaners are connected to the air intake chamber as described above, so that as with the above item, the air intake sound is low even without enlarging the volume of the air cleaner itself, and merits with respect to appearance and mounting are obtained. The air intake chamber has been taken as being used in common, whereby the inner volume is more easily secured than in a case where air take chambers are provided in a manner to be matched in number with that of air cleaners and the like, and in addition, an increase in the number of parts can be controlled.

DETAILED DESCRIPTION OF THE PREFERRED EMBODIMENTS

Figure 1:
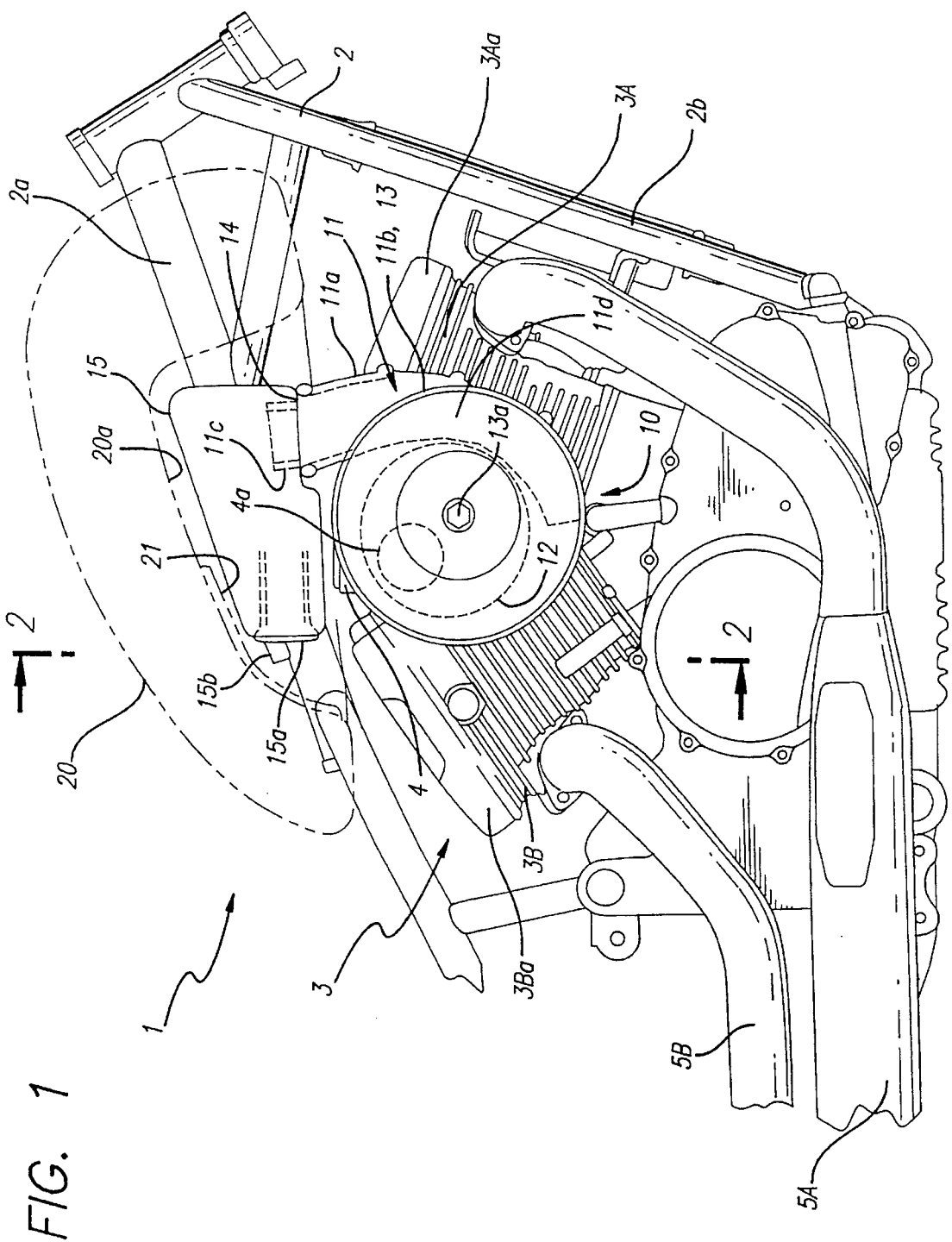
FIG. 1 is a side view showing principal parts of the motorcycle 1 as the first embodiment of the present invention.

As shown in FIG. 1, a motorcycle 1 of the first embodiment is of the type in which a V-type, two-cylinder engine 3 is horizontally placed (with a crankshaft extending in the right and left direction of a body frame 2) with respect to the double cradle-type body mainly consisting of a pipe group. Similarly to an ordinary body, the engine 3 is provided between an upper main frame (upper pipe) 2a and a front/lower down tube 2b of the frame 2, and a fuel tank 20 is mounted on the main frame 2a. Reference codes 3A, 3B in FIGS. designate respective cylinders of the engine 3; and codes 5A, 5B designate exhaust pipes or mufflers from the respective cylinders 3A, 3B.

Arranged between two cylinders 3A, 3B (in the V-shaped root portion) is a carburetor 4 used in common to them, on one side of which (on the right side of the body) an air cleaner 10 is provided. That is, as shown in FIG. 2, the carburetor 4 is mounted with a bleeder 4b directed to the engine 3 (that is, communicating with the cylinder heads 3A, 3B in FIG. 1) set to the inside and with a bleeder 4a on the upstream side directed to the right side of the body; and connected to one side of the bleeder 4a is the air cleaner 10.

For the purpose of achieving a smaller size of the above-mentioned air cleaner 10 provided on the side of the body or for the like purpose, in the motorcycle 1, an air intake chamber 15 is separately provided as shown FIG. 1, and connected to the upstream side of the air cleaner 10. The air intake chamber 15 is allowed to have substantially the same inner volume as that of the air cleaner 10, and both the members 10, 15 function as expansion chambers with respect to the intake air reaching the engine 3, thereby allowing the pulsation of the intake air to be effectively damped and the air intake sound to be reduced even where the air cleaner 10 itself is not so large. The air intake chamber 15 which is connected to the upstream side of the air cleaner 10 is provided with an air suction port 15a which is opened outward to suck fresh air.

Figure 2:
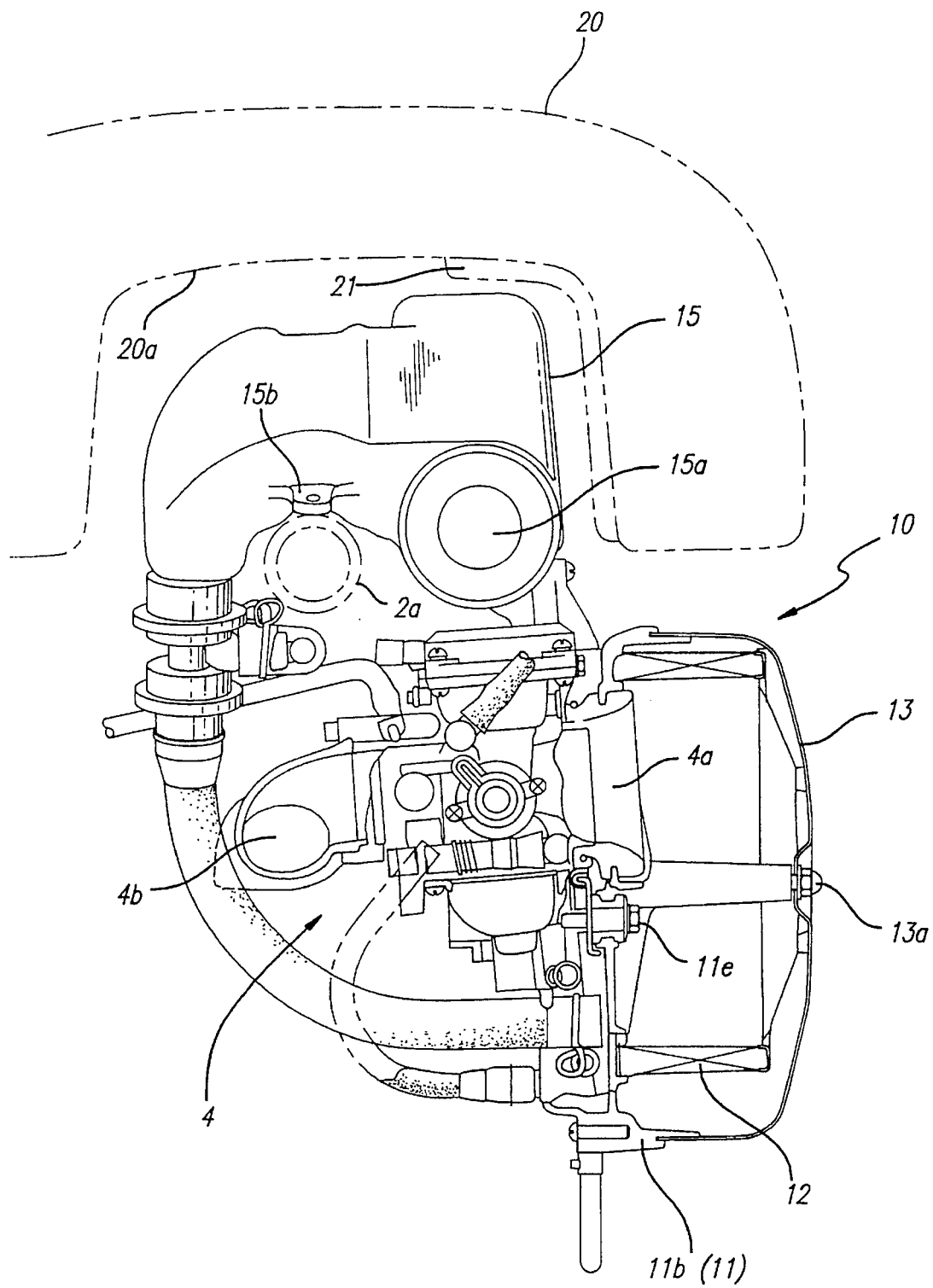
FIG. 2 is a detailed view of the air cleaner 10 and the like and a view taken on line II—II in the arrow direction of FIG. 1.

The air intake chamber 15 is arranged at a position at which the chamber is covered with the fuel tank 20 as shown in FIG. 1, and provided across the main frame 2a as shown in FIG. 2. The mounting of the air intake chamber 15 is such that a groove-shaped concavity allowing the main frame 2a to pass through and a box-shaped concavity 20a for housing the air intake chamber 15 have been formed in the tank 20, and then the air intake chamber 15 is mounted in a manner to cross the main frame 2a and fixed through a bracket 15b and bolts/nuts (not shown) to the main frame 2a, and thereafter can be covered with the tank 20 from the upper side. With this arrangement, the air intake chamber 15 is easily mounted, and in addition, the air intake chamber 15 together with the place of the air suction port 15a having a high air intake sound is covered with the tank 20, thereby allowing a spread of noise to be controlled. Of the concavity 20a of the tank 20, a portion near the air suction port 15a of the air intake chamber 15 has been affixed with a foamed urethane-made sound absorbing material 21, so that the effect of reducing noise is more remarkable. Although the air intake chamber 15 is made of an inexpensive resin and not specifically provided with a design, the chamber is hidden by the tank 20 and thus not visible, thereby not ruining the appearance of the motorcycle 1.

The air intake chamber 15 and the air cleaner 10 are constructed as separated, connectable members so as to be easily mounted to the motorcycle 1. That is, as shown in FIG. 1, both the members are made connectable and disconnectable at a mating face 14, and an upwardly extended port 11c as a joint is inserted into the air intake chamber 15, thereby allowing both the members to be integrated. The gap surrounding the extended port 11c when inserted is sealed based on the elasticity of the resin composing the air intake chamber 15, allowing a seal between the air cleaner 10 and the air intake chamber 15.

The air cleaner 10 used is such that a pipe-shaped portion 11a connected to the air intake chamber 15, a disk-shaped holder 11b connected thereto and a cylindrical cover 13 compose a casing 11, and a cylindrical filter element (outer peripheral surface filter type) 12 is contained between the holder 13. The holder 11b is mounted by bolts/nuts (such as a bolt 11e in FIG. 2) to the cylinder 3A or 3B of the engine 3. In order to simplify construction and facilitate maintenance, the cover 13 is fixedly mounted by a single bolt 13a provided on the center portion thereof to the holder 11b, and in association with it, as shown in FIG. 1, the bleeder 4a reaching the carburetor 4 and the element 12 are provided at an eccentric position. In association with that the element 12 is eccentrically arranged, the more closely a connection part 11d of the pipe-shaped portion 11a for the holder 11b approaches the downstream side, the smaller the sectional area of the connection part 11d, so that a change of the flow velocity of intake air in each cross section reduces and thus the stream of intake air becomes smooth. There is also an advantage in that the axial center, that is, the portion through which the bolt 13a is penetrated is made horizontal so that intake air can be introduced from the upper side toward outer peripheral vicinity, whereby the dust in intake air is separated by a centrifugal force and accumulates in the lower portion of the cover 13, causing the clogging of the element 12 to hardly occur.

Figure 3:
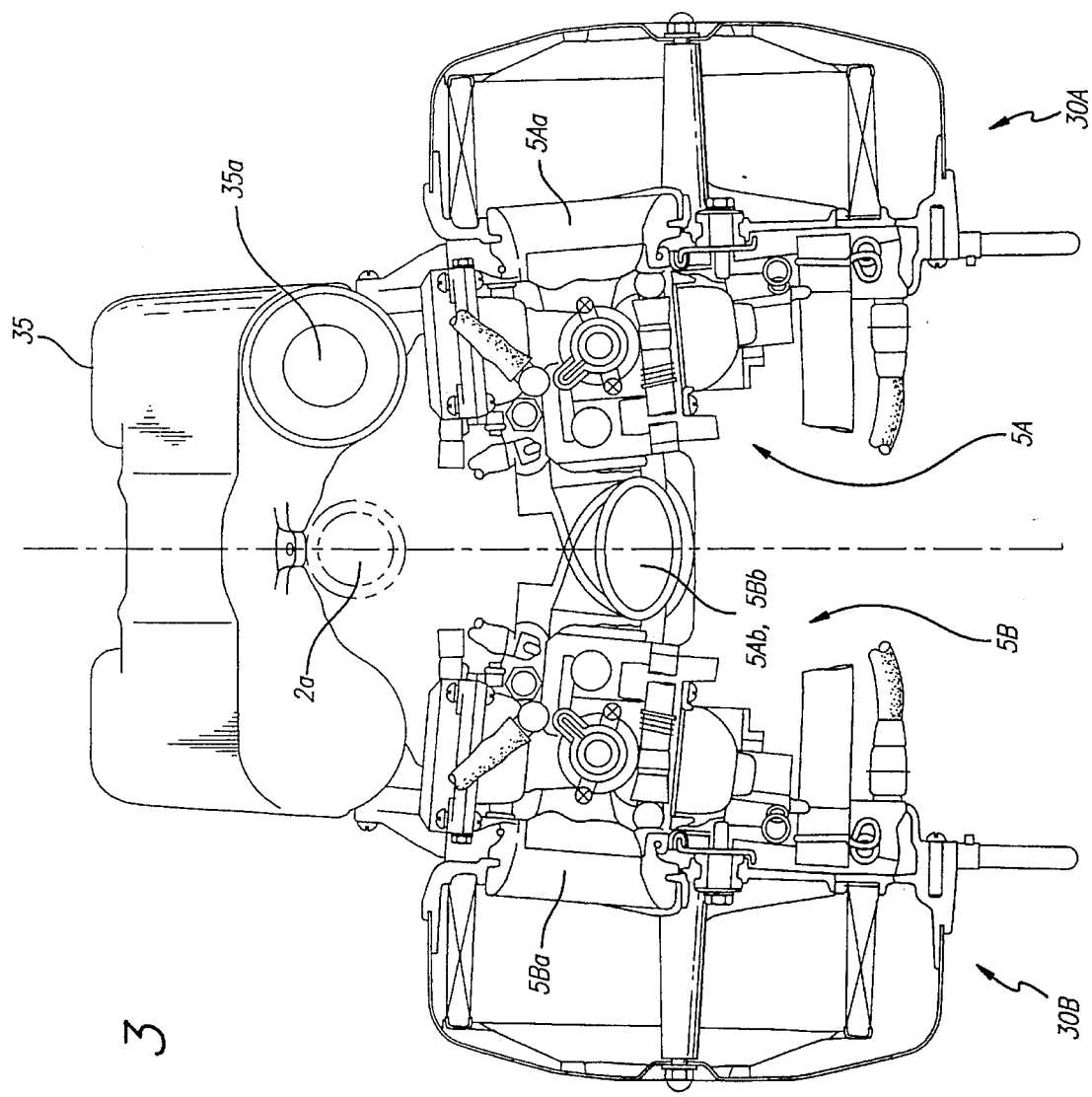
FIG. 3 shows the second embodiment of the present invention and is a view showing similar parts of a motor cycle viewed in the same direction as in the above-mentioned embodiment of FIG. 2.

Then, a second embodiment of the present invention is shown in FIG. 3. FIG. 3 is a view showing similar parts of a motor cycle (whole illustration is omitted) viewed in the same direction as in the above-mentioned embodiment of FIG. 2. In this embodiment, two carburetors 5A, 5B are provided with respect to a plural-cylinder engine (not shown), and air cleaners 30A, 30B are respectively connected to respective upstream sides of carburetors 5a, 5b, so that in proportion to the increased number of carburetors, the efficiency of air intake is more improved and the output performance of the engine becomes higher. Similarly to the embodiment of FIG. 2, the respective carburetors 5A, 5B are mounted with bleeders 5Ab, 5Bb directed to the engine set to the inside and with bleeders 5Aa, 5Ba on the upstream side directed to the outer sides of the body (to the right and left sides); and connected to both sides of the bleeders 5Aa, 5Ba are the air cleaners 30A, 30B.

In this embodiment of FIG. 3, connected to the upstream side of the two air cleaners 30A, 30B is an air intake chamber 35. The air intake chamber 35 has also been given an inner volume equal to or larger than the respective air cleaners 30A, 30B, so that the pulsation of the intake air is weakened, and as a result, the effect of reducing the air intake sound is obtained even without enlarging the size of the air cleaners 30A, 30B. Similarly to the embodiments of FIGS. 1 and 2, the air intake chamber 35 has a fuel tank (not shown) housed in the concavity thereunder, and crosses the maine frame 2a and is fixed thereon as shown in FIG. 3, so that there is an effect of preventing the emission of the air intake sound and the like generated mainly in an air suction port 35a, that the appearance of the motorcycle is not ruined, and that the air intake chamber 35 is easily mounted. Although the air intake chamber 35 is a single member used in common to the two sets of the air cleaners 30A, 30B and the carburetors 5A, 5B, the chamber is desirable because the volume is secured (larger volume is important to reduce the air intake sound) more easily than in a case where the chamber is divided into two members to provide, and an increase in the number of parts can be controlled.

The motorcycle of the present invention can have the following effects:

The pulsation of the intake air is made weakened, so that the air intake sound is reduced even without enlarging the volume of the air cleaner itself. The air cleaner requires no large volume, so that no air cleaner approaches the driver's legs or ruins the appearance of the motorcycle.

The above-mentioned air intake chamber is housed in the concavity under the fuel tank, so that such construction is desirable with respect to the appearance of the motorcycle, and advantageous also with respect to the cost required for the air intake chamber.

The air intake chamber is covered with the fuel tank, so that there is a particularly high effect of preventing noise in that the air intake sound generated at the fresh air suction port and the like thereof is hardly emitted outward.

The air intake chamber is provided at a position under the fuel tank and across the main frame of the body, so that the chamber can be fixed easily and securely.

In other embodiments, the air cleaner and the air intake chamber are separately constructed, so that they are easily manufactured and incorporated into the motorcycle.

In further embodiments, a sound absorbing material is mounted to the portion facing the fresh air suction port likely to generate a high air intake sound, so that the noise reduction effect as shown above is even more remarkable.

In yet one more embodiment, two sets of air cleaners and carburetors are used, so that the construction is desirable with respect to the engine performance. In addition to the above-mentioned effect, there are also advantages of easily securing the volume of the air intake chamber and of controlling an increase in the number of parts.

What is claimed is:

1. A motorcycle in which an air cleaner is arranged on one side of a body thereof, characterized in that an air intake chamber provided with a fresh air suction port located under a fuel tank and connected to the upstream side of the air cleaner goes is substantially accommodated in a concavity formed under the fuel tank and said air intake chamber is constructed so as to expand the sucked air through the fresh air suction port.

2. A motorcycle as set forth in claim 1, wherein the air cleaner and said air intake chamber are separately constructed and connected through a sealable joint to each other.

3. A motorcycle as set forth in claim 1, wherein a sound absorbing material is mounted to a portion facing said fresh air suction port of the air intake chamber, of the concavity under the fuel tank.

4. A motorcycle as set forth in claim 2, wherein a sound absorbing material is mounted to a portion facing said fresh air suction port of the air intake chamber, of the concavity under the fuel tank.

5. A motorcycle as set forth in claim 1, wherein air cleaners are arranged on the right and left sides of the body, and carburetors are connected respectively to the downstream side thereof;

wherein a commonly-used air intake chamber is provided on the upstream side of the air cleaners.

6. A motorcycle as set forth in claim 2, wherein air cleaners are arranged on the right and left sides of the body, and carburetors are connected respectively to the downstream side thereof;

wherein a commonly-used air intake chamber is provided on the upstream side of the air cleaners.

7. A motorcycle as set forth in claim 3, wherein air cleaners are arranged on the right and left sides of the body, and carburetors are connected respectively to the downstream side thereof;

wherein a commonly-used air intake chamber is provided on the upstream side of the air cleaners.

8. A motorcycle as set forth in claim 4, wherein air cleaners are arranged on the right and left sides of the body, and carburetors are connected respectively to the downstream side thereof;

wherein a commonly-used air intake chamber is provided on the upstream side of the air cleaners.

9. A motorcycle comprising:

an air cleaner disposed on one side of said body;

a fuel tank disposed on said body;

an air intake chamber having a fresh air suction port;

said air intake chamber being constructed so as to expand the sucked air through the fresh air port; and, said air intake chamber being connected to an upstream side of said air cleaner and substantially accommodated in a concavity disposed beneath said fuel tank.

10. A motorcycle as set forth in claim 9, wherein said air cleaner is an independent construction from said air intake chamber; and wherein a sealable joint connects said air intake chamber to said upstream side of said air cleaner.

11. A motorcycle as set forth in claim 9, further comprising:

a sound absorbing material disposed on a wall of said concavity at a region near said fresh air suction port of said air intake chamber.

12. A motorcycle as set forth in claim 10, further comprising:

a sound absorbing material disposed on a wall of said concavity at a region near said fresh air suction port of said air intake chamber.

13. A motorcycle comprising:

a body having a main frame;

first and second air cleaners disposed on opposite sides of said body;

a fuel tank disposed on said body;

a commonly-used air intake chamber having a fresh air suction port; and said commonly-used air intake chamber is constructed so as to expand the sucked air through the fresh air port; and, said commonly used air intake chamber being connected to an upstream side of said first and second air cleaners and substantially accommodated in a concavity disposed beneath said fuel tank.

14. A motorcycle as set forth in claim 13, wherein said first and second air cleaners are an independent construction from said commonly-used air intake chamber; and wherein a first and second sealable joint respectively connects said commonly-used air intake chamber to said upstream side of said first and second air cleaners.

15. A motorcycle as set forth in claim 13, further comprising a sound absorbing material disposed on a wall of said concavity at a region near said fresh air suction port of said commonly-used air intake chamber.

16. A motorcycle as set forth in claim 14, further comprising a sound absorbing material disposed on a wall of said concavity at a region near said fresh air suction port of said commonly-used air intake chamber.

17. A motorcycle as set forth in claim 13, further comprising first and second carburetors connected respectively to a downstream side of said first and second air cleaners.

18. A motorcycle as set forth in claim 14, further comprising first and second carburetors connected respectively to a downstream side of said first and second air cleaners.

19. A motorcycle as set forth in claim 15, further comprising first and second carburetors connected respectively to a downstream side of said first and second air cleaners.

20. A motorcycle as set forth in claim 16, further comprising first and second carburetors connected respectively to a downstream side of said first and second air cleaners.

21. A motorcycle in which an air cleaner is arranged on one side of a body thereof, characterized in that an air intake chamber having a fresh air suction port and connected to the upstream side of the air cleaner goes in a concavity formed under a fuel tank and is provided at a position across a main frame of the body, and wherein a sound absorbing material is mounted to a portion facing said fresh air suction port of the air intake chamber, of the concavity under the fuel tank.

22. A motorcycle as set forth in claim 21, wherein the air cleaner and said air intake chamber are separately constructed and connected through a sealable joint to each other.

23. A motorcycle as set forth in claim 22, wherein air cleaners are arranged on the right and left sides of the body, and carburetors are connected respectively to the downstream side thereof;

wherein a commonly-used air intake chamber is provided on the upstream side of the air cleaners.

24. A motorcycle as set forth in claim 21, wherein air cleaners are arranged on the right and left sides of the body, and carburetors are connected respectively to the downstream side thereof;

wherein a commonly-used air intake chamber is provided on the upstream side of the air cleaners.

25. A motorcycle in which an air cleaner is arranged on one side of a body thereof, characterized in that an air intake chamber having a fresh air suction port and connected to the upstream side of the air cleaner goes in a concavity formed under a fuel tank and is provided at a position across a main frame of the body; wherein air cleaners are arranged on the right and left sides of the body, and carburetors are connected respectively to the downstream side thereof; and, wherein a commonly-used air intake chamber is provided on the upstream side of the air cleaners.

26. A motorcycle as set forth in claim 25, wherein the air cleaner and said air intake chamber are separately constructed and connected through a sealable joint to each other.

27. A motorcycle comprising:

a body having a main frame;

an air cleaner disposed on one side of said body;

a fuel tank disposed on said body;

an air intake chamber having a fresh air suction port;

said air intake chamber being positioned across said main frame;

said air intake chamber being connected to an upstream side of said air cleaner and extending along a concavity disposed beneath said fuel tank; and, a sound absorbing material disposed on a wall of said concavity at a region near said fresh air suction port of said air intake chamber.

28. A motorcycle as set forth in claim 27, wherein said air cleaner is an independent construction from said air intake chamber; and wherein a sealable joint connects said air intake chamber to said upstream side of said air cleaner.

29. A motorcycle comprising:

a body having a main frame;

first and second air cleaners disposed on opposite sides of said body;

a fuel tank disposed on said body;

a commonly-used air intake chamber having a fresh air suction port;

said commonly-used air intake chamber being connected to an upstream side of said first and second air cleaners and extending along a concavity disposed beneath said fuel tank; and, a sound absorbing material disposed on a wall of said concavity at a region near said fresh air suction port of said commonly-used air intake chamber.

30. A motorcycle as set forth in claim 29, wherein said first and second air cleaners are an independent construction from said commonly-used air intake chamber; and wherein a first and second sealable joint respectively connects said commonly-used air intake chamber to said upstream side of said first and second air cleaners.

31. A motorcycle as set forth in claim 30, further comprising first and second carburetors connected respectively to a downstream side of said first and second air cleaners.

32. A motorcycle as set forth in claim 29, further comprising first and second carburetors connected respectively to a downstream side of said first and second air cleaners.

* * * * *